(12) United States Patent
Ronkainen

(10) Patent No.: US 11,172,036 B2
(45) Date of Patent: Nov. 9, 2021

(54) APPLICATION SERVICE CONTROL METHOD

(71) Applicant: ROVIO ENTERTAINMENT LTD., Espoo (FI)

(72) Inventor: Sami Ronkainen, Espoo (FI)

(73) Assignee: ROVIO ENTERTAINMENT LTD., Espoo (FI)

( * ) Notice: Subject to any disclaimer, the term of this patent is extended or adjusted under 35 U.S.C. 154(b) by 52 days.

(21) Appl. No.: 15/903,257

(22) Filed: Feb. 23, 2018

(65) Prior Publication Data

US 2018/0248966 A1  Aug. 30, 2018

(30) Foreign Application Priority Data

Feb. 27, 2017 (FI) ...................... 20175181

(51) Int. Cl.
```
H04L 29/08      (2006.01)
G06Q 10/10      (2012.01)
A63F 13/44      (2014.01)
G06Q 30/02      (2012.01)
G07F 17/32      (2006.01)
```

(52) U.S. Cl.
CPC .............. *H04L 67/22* (2013.01); *A63F 13/44* (2014.09); *G06Q 10/109* (2013.01); *G06Q 30/0209* (2013.01); *A63F 2300/638* (2013.01); *G07F 17/32* (2013.01)

(58) Field of Classification Search
None
See application file for complete search history.

(56) References Cited

U.S. PATENT DOCUMENTS

| | | | |
|---|---|---|---|
| 10,275,801 B2* | 4/2019 | Lindo | G06Q 30/0269 |
| 2014/0080556 A1* | 3/2014 | Knutsson | G07F 17/32 463/7 |
| 2014/0164044 A1* | 6/2014 | DeRoller | G06Q 10/103 705/7.22 |
| 2016/0150078 A1* | 5/2016 | Joshi | H04W 4/21 705/14.23 |
| 2016/0171525 A1* | 6/2016 | Ezra | G06Q 30/0225 705/14.12 |
| 2016/0345132 A1 | 11/2016 | Creighton et al. | |

(Continued)

FOREIGN PATENT DOCUMENTS

| | | |
|---|---|---|
| WO | 2012022021 A1 | 2/2012 |
| WO | 2013173511 A2 | 11/2013 |
| WO | WO 2015/073983 A2 | 5/2015 |

OTHER PUBLICATIONS

Apr. 16, 2018 Extended Search Report issued in European Patent Application No. 18158089.5.

(Continued)

*Primary Examiner* — Angela Nguyen
(74) *Attorney, Agent, or Firm* — Squire Patton Boggs (US) LLP

(57) ABSTRACT

The present invention relates to methods, systems and computer program products for enhancing use of application services controlled by user-specific timing intervals. The current invention addresses these problems in a novel fashion by monitoring context of the user to determine a best time to notify the user of the coming expiry of his or her user-specific timing interval.

13 Claims, 3 Drawing Sheets

(56) References Cited

U.S. PATENT DOCUMENTS

2018/0102023 A1* 4/2018 Baszucki ............ G07F 17/3225
2018/0189837 A1* 7/2018 Panchaksharaiah ........................
G06Q 30/0264

OTHER PUBLICATIONS

Finnish Search Report dated Sep. 11, 2017 corresponding to Finnish Patent Application No. 20175181.
Matti Rantanen et al., "InfoRadar: Group and Public Messaging in the Mobile Context," In: NordiCHI '04: Proceedings of the third Nordic conference on Human-computer interaction. ACM, Oct. 2004, Conference held Oct. 23-27, 2004, Tampere, Finland.
Jani Mäntyjärvi, "Sensor-based context recognition for mobile applications," VTT Technical Research Centre of Finland, VTT Publications 511, Dec. 2003.
Albert Schmidt et al., "There is more to Context than Location," Computers and Graphics, pp. 1-10, 1998.

\* cited by examiner

APPLICATION SERVICE CONTROL METHOD

BACKGROUND

Field

Examples of the present invention relate to methods, apparatuses, systems and related computer program products for enhancing use of application services controlled by user-specific timing intervals.

Description of the Related Art

Applications that provide services typically include timing intervals that are used to limit use of the amount of free services, or to invite users to use the service more frequently. Some implementation exists, where a timing interval is triggered when the user exits the application, and users are reminded to return to the application when the timing interval expires. Some implementations exist, where the amount of free play is controlled by lives that revive within a predefined timing interval, and users are reminded when these lives have been restored in full. Also some implementation exist, where an advantage, for example a reward, is gained only after a specific timing interval has expired, and a new reward can only be requested after the earlier reward has been accepted within the application.

For example, in game applications, a reward may be earned by giving a specific user input, and then letting time lapse for a predefined timing interval. Sometimes this timing interval is illustrated in the game graphics by a game element growing, hatching or otherwise maturing during the time necessary to wait. The end of the timing interval serves as a rewarded appointment to return frequently back to the gameplay. It has been detected that these user-specific timing intervals often expire unnoticed, and considerable time to earn these rewards is unnecessarily lost. Some applications remind their users of expiry of the user-specific timing intervals, but it is clear that if the user is unable to use the service at the time of the reminder, the reminder does not significantly improve the efficient use of the application service.

SUMMARY

According to one example embodiment, a method is presented comprising initiating a user-specific timing interval for triggering a function of a user application, storing a ruleset associating one or more triggering contexts with a user notification, monitoring context of the user, and in response to detecting a triggering context before expiry of the user-specific timing interval, providing the user with the user notification.

According to another embodiment computer program product is presented. When the computer program product is executed by one or more processors, it causes an apparatus to perform at least the steps for initiating a user-specific timing interval for triggering a function of a user application, storing a ruleset associating one or more triggering contexts with a user notification, monitoring context of the user, and in response to detecting a triggering context before expiry of the user-specific timing interval, providing the user with the user notification.

According to another embodiment a user device is presented. The user device comprises a timing module configured to initiate a user-specific timing interval for triggering a function of a user application, a ruleset module configured to store a ruleset associating one or more triggering contexts with a user notification, and a monitoring unit, configured to monitor context of the user, and in response to detecting a triggering context before expiry of the user-specific timing interval, to provide the user with the user notification.

According to another embodiment a server is presented. The server comprises a timing module configured to initiate a user-specific timing interval for triggering a function of a user application, a ruleset module configured to store a ruleset associating one or more triggering contexts with a user notification, and a monitoring unit, configured to monitor context of the user, and in response to detecting a triggering context before expiry of the user-specific timing interval, to provide the user with the user notification.

The present invention brings many advantages to enhancing user experience of an application and availability of the service provided by the application.

The current invention addresses these problems in a novel fashion by monitoring context of the user to determine a best time to notify the user of the coming expiry of his or her user-specific timing interval. To further improve efficiency of the arrangement, the user may be offered incentives if they respond to the advanced notification.

BRIEF DESCRIPTION OF THE DRAWINGS

The embodiments of the invention are illustrated by way of example—not by way of limitation, in the figures of the accompanying drawings.

DETAILED DESCRIPTION

Figure 1:
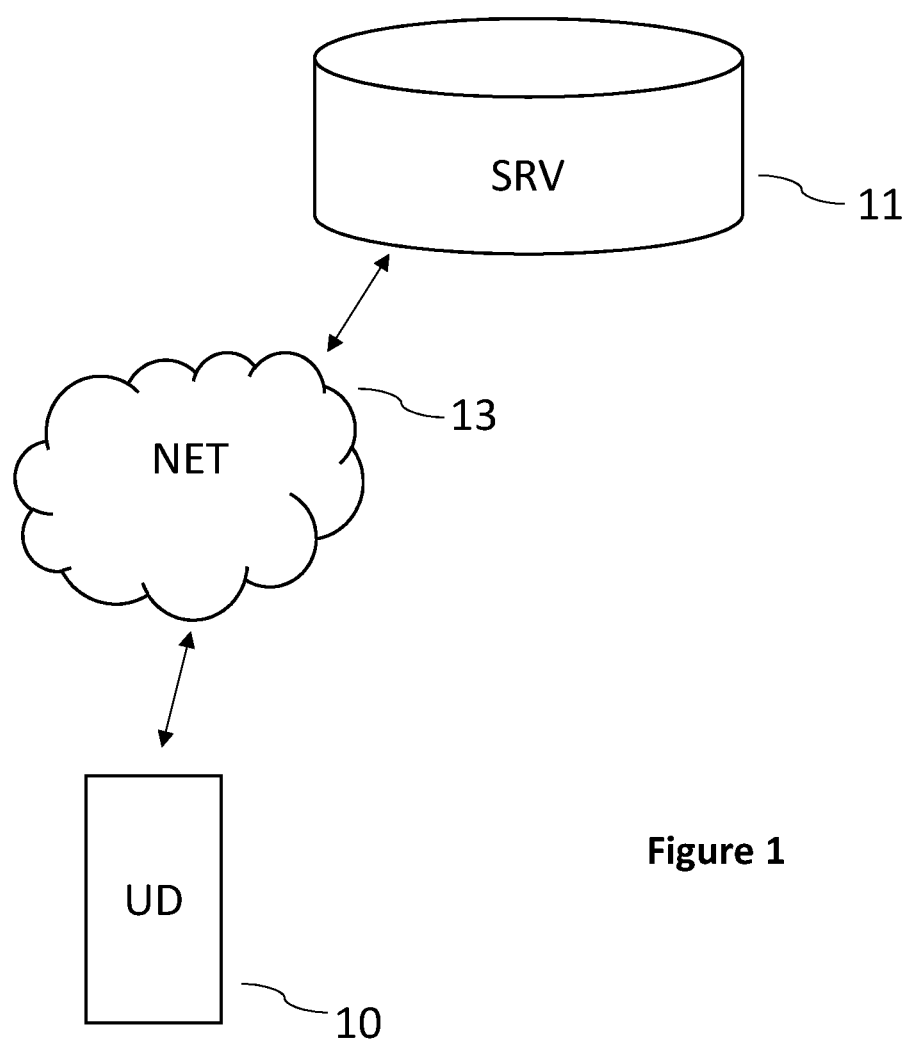
FIG. 1 illustrates a simplified arrangement where at least some example embodiments may be embodied.

The following embodiments are exemplary only. Although the description may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described in detail. Various implementations of the information system comprise elements that are suitable for the example embodiments and may not be specifically described herein.

Example methods, systems, apparatuses and a computer program products are presented for enhancing control of use of application service.

As used herein, the term "user device" refers to a computing device and it may be for example a laptop, desktop computer, graphics tablet, cellular phone, media system of a vehicle, an electronic noticeboard, a television, or any other device with capabilities for running at least one application, like a game application. The user device may comprise, or be connected to a camera, a microphone, various types of sensors, and other components providing capability to detect context of the user of the device.

As used herein, the term "context" refers here to values of a predefined set of parameters selected for context-aware computing to characterise the situation of the user. Values for the selected parameters may be derived from various context sources. These include, for example, location, time, device processes, context sources over the network, and sensing elements integrated into or connected to a user device. State of the art description on the context-aware computing may be referred from, for example, academic dissertation document of Jani Mäntyjärvi "Sensor-based context recognition for mobile applications", VTT Technical Research Centre of Finland 2003. Albert Schmidt et. al discuss broad understanding of context beyond location in their paper "There is more to Context than Location", Computers and Graphics 1998, which describes how location is just a parameter among others that may be used for recognizing context, in other words, the situation of the user.

As used herein, the term "application" refers to a proprietary software enabling a user to perform a particular computer-implemented task or tasks. The application software contains such instructions that, when executed by one or more processors, causes a computing device to perform tasks. The application may also be referred as software application, application program, application software, app, for example. It is to be noted that in at least some of the example embodiments also system software providing a platform for running the application can be considered functionally similar, or as part of to the application. Alternatively, or in addition to, also set of instructions based on HTML5 mark-up language may be considered as an application. The application may be used on a computing device, in several computing devices, on a server or several servers and it may utilize cloud computing.

As used herein, the term "server" refers to a physical or virtual computational entity capable of enhancing information and to perform computational tasks. The term server may refer to one entity or a group on entities configured to operate jointly with capabilities for running an application and interacting with at least one user device.

As used herein, the term "ruleset" refers to a set of rules, each of which defines a value, values, or a range of values against which temporal values of one or more parameters can be compared for compliance. If compliance is detected, the rule is met, and the ruleset may thus be used to associate the set of rules to a dataset, or to one or more application functions, or to a combination of them such that when a predefined set of rules, or all rules of the ruleset have been met, the associated dataset or the one or more associated functions are invoked. Datasets may be invoked, for example, by selecting the dataset for a successive computing function. Functions may be invoked by, for example, initiating their processing.

While various aspects of the invention are illustrated, and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

FIG. 1 is a simplified diagram of a system, where embodiments of the current invention may be implemented. Only one user device (UD) 10 is depicted but in practise there may be a number of those in the system. Server (SRV) 11 stores and exchanges information between various entities in the system. It may for example store information relating to the media content, the media content essence data and so on. The server 11 may further store information relating to the game application and/or the user. The network 13 may comprise, for example, a personal area network, a local area network, a home network, a storage area network, a campus network, a backbone network, a metropolitan area network, a wide area network, an enterprise private network, a virtual private network, or a combination of any of these.

The example network system of FIG. 1 is a simplified illustration depicting one user device 10, one server 11 and one display device 12. The number of the elements may vary and in some example embodiments some of the elements may be non-existing and functionalities of the two or more elements may be embodied in one element.

Figure 2:
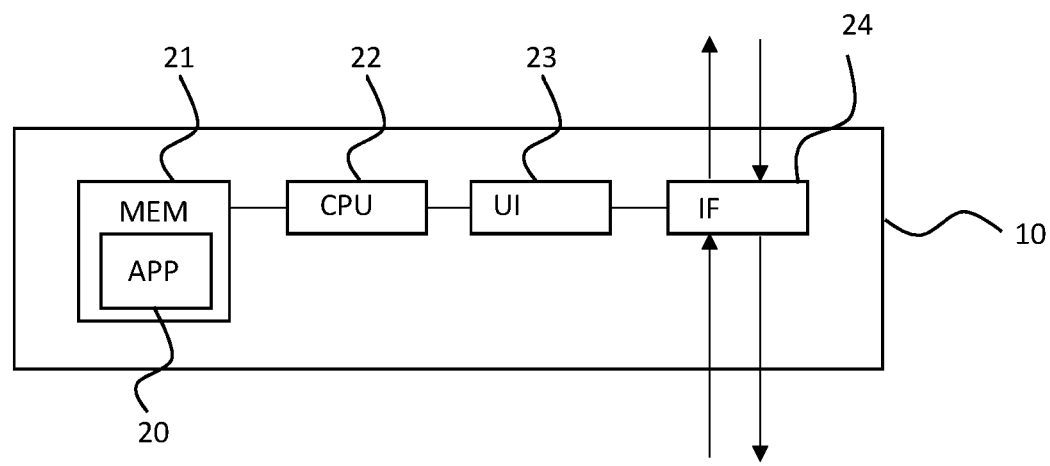
FIG. 2 illustrates a block diagram of a game device.

FIG. 2 illustrates a simplified example block diagram of a user device 10. The user device 10 comprises at least one application 20 (APP), which can be any kind of application or a set of applications running at least partly on the user device 10. The user device 10 may further comprise a memory 21 (MEM) for storing the game application 20 and other information. The memory 21 may comprise volatile or non-volatile memory, for example EEPROM, ROM, PROM, RAM, DRAM, SRAM, firmware, programmable logic, etc. The user device 10 may further comprise one or more processor units 22 (CPU) for running the application 20 and other applications, a user interface 23 (UI) for giving instructions to the computer programs and presenting information to a user and an interface 24 (IF). In addition, the user device 10 may comprise various input/output and other components like a battery, microphone, speakers, display typical for example for a smart phone or a tablet device which are not illustrated in FIG. 2.

Figure 3:
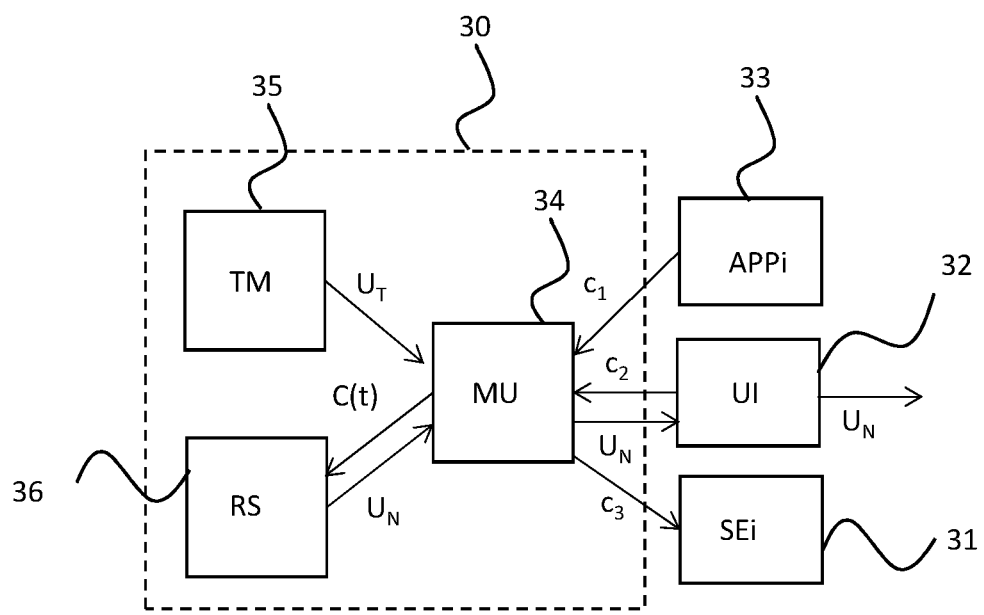
FIG. 3 illustrates functional elements for implementing the exemplary method in a user device.

FIG. 3 illustrates one example embodiment for implementing the method by means of an application in a user device. FIG. 3 illustrates relevant parts of the user device with functional elements that are communicatively coupled to each other. The functional elements may be implemented in, for example, hardware, software, firmware, special purpose circuits or logic, a computing device or some combination thereof. The context-aware application (hereinafter: first application) 30 is communicatively connected to one or more sensor elements 31. The sensor elements 31 may be integrally included in the user device, or coupled to the user device to move to environments and conditions with the user. In an example, a sensor device may be external to the user device, but be coupled to deliver sensor signals or computed sensor values to the user device, when the user device is near (for example in the range of near-field-communication or Bluetooth communication ranges). The sensor elements may include, for example, optical sensing elements, audio sensing elements, pressure sensing elements, acceleration sensing elements, angular rate sensing elements, particle detectors, radiation detectors, and the like.

As disclosed earlier, the user device may also include a user interface 32 through which the user may provide input for the processes within the user device, and receive output from processes of the user device. For example, the first application may be configured to receive from the user his or her temporal status data. The user may be provided with an option to select types of status information ("in a meeting") by activating an input function of the first application.

The user device may include one or more further applications 33 that may run internally, based on information stored or available from elements in the user terminal. Alternatively, the applications may apply information accessible over network connections of the user terminal. For example, the application may be a calendar application into which the user has marked a period with ("in a meeting"). The first application may be given access to the information of the calendar application so that the schedule of the user may be applied as a context source.

The sensor elements, the user interface and the further applications are herein examples of possible context sources for the application. For a person skilled in the art it is clear that other context sources may be applied within the scope. The application 30 may include a monitoring unit 34 that receives context data c1, c2, c3 from the context sources. The monitoring unit may receive the information in many ways, and through various interfaces, depending on the configuration of the context sources. The monitoring unit 34 may receive the context data for processing from one or more of the context sources 31, 32, 33 through an application programming interface (API) of the application, as shown in FIG. 3. It is also possible that the user device includes an application, or a platform functionality that communicates with the context sources and computes therefrom context data packets made accessible for elements of the user device.

The monitoring unit may be coupled to a timing module 35 that is part of the application, and controls timing of one or more functions of the application. In this example, the timing module 35 is configured to initiate a user-specific timing interval that triggers a function of a user application. The term user-specific means here that the timing interval is initiated for the user, based on one or more actions of the user, based on profile characteristics of the user, or even by random choice of the user by the application, or a server communicating with the application. To reduce complexity of the application, the timing interval may be the same, i.e. defined similarly for all users of the programmed application. The timing module 35 may also follow progress of time in respect of the timing interval, and thereby enable comparison whether a monitored action takes place before or after expiry of the timing interval.

The monitoring unit may be coupled to a ruleset module 36 that is configured to associate one or more triggering contexts with a user notification. The user notification may be a dataset, a function, or a combination of them. The user notification may include for example, selecting a character string forming a message to be notified to the user, and initiating a function for delivering the message to the user. The user notification may include also initiating a function for forming a character string for a message, and initiating another function for delivering the message to the user. Other combinations of functions are also possible. The context data from the context sources may be mapped into parameters, and the temporal values of the parameters may be compared to rules of the ruleset to determine whether a user notification is activated. The ruleset includes at least one set of rules for at least one user notification, but the ruleset may include two or more user notifications and their associated sets of rules.

Rules of the ruleset of the ruleset module 36 store information to which the temporal context data c1, c2, c3 may be compared to determine whether provision of the user notification is to be activated or not. A set of temporal context data that compares successfully, in other words, complies with the rules of the ruleset 36 is referred herein as a triggering context. In the present example, the user is provided with the user notification when a triggering context is detected before expiry of the user-specific timing interval.

Accordingly, the timing module 35 initiates a user-specific timing interval for triggering a function of a user application, the ruleset module 36 stores a ruleset associating one or more triggering contexts with a user notification, and the monitoring unit 34 monitors context of the user. These functional elements 34, 35, 36 are connected to interoperate such that when a triggering context is detected before expiry of the user-specific timing interval, the user provided with the user notification. The monitoring unit may be considered as a continuously operating sub-part of the application that applies context-aware computation to activate the other parts of the application for user interaction in optimal times from both the user perspective and the application service provider perspective.

Let us first illustrate the process in its simplest form with examples. A promotion application is a proprietary software module that may be installed to a user device to promote, and optionally also facilitate online sales of a commercial distributor. In some of the conventional promotion applications, the timing module may initiate the user-specific timing interval when the user exits the application, or when the user completes a purchase, and send a reminder to the user to return to view the updates and promotions when the user-specific timing interval has expired. However, many times the user receives these reminders when he or she is unable to properly attend to it, so they go unnoticed. In the worst case, a reminder may cause irritation when it arrives at a bad time. In the present example, the ruleset of the ruleset module is configured such that a trigger context corresponds to context data in situations when the user could be free to use the user device, for example, when the user is in the airport terminal, or in a train, in a waiting room, etc. This context data may be associated to a user notification that includes a dataset carrying a promotional message and a function for delivering the promotional message to the user. The application may be configured to use monitoring module to collect context data, compare it to the rules of the ruleset of the ruleset module, and at some time detect a trigger context. When that happens, the application may thus be configured to deliver the promotional message to the user through the user interface of the user device.

As another example, a game application is a proprietary software module that may be installed to a user device to provide access to a set of gaming functions, locally in the user device or at least partially online through network connections. In some of the conventional game applications, the timing module may initiate the user-specific timing interval related to some specific game event. A very common feature is that something in the gameplay needs time to mature in some way (e.g. grow or hatch), and this interval is controlled by means of user-specific timing intervals. In some of the conventional games, the user may get a reminder that the user-specific timing interval has expired, and the game event is complete. However, many times the user receives these reminders when he or she is unable to return to play to reactivate the game event for more grown or hatched items, so much of the possible advantages go by. Also in this example, the ruleset of the ruleset module may be configured such that a trigger context corresponds to user context data in situations when the user could be free to use the user device, for example, when the user is in the airport terminal, or in a train, in a waiting room of a physiatrian, etc. This context data is associated to a user notification that includes a dataset carrying a reminder message ('your carrots will be fully grown 2:04 p.m., don't forget!') and a function for delivering the reminder message to the user. The application may be configured to use monitoring module to collect context data, compare it to the rules of the ruleset of the ruleset module, and at some time detect a trigger context.

When that happens, the application may be configured to deliver the reminder message to the user through the user interface of the user device.

When the context is used for characterizing a situation of the user, there is no need to compare the location of the user to one or more locations defined in the application. A trigger context may occur anywhere, in any geographical location, and the trigger context is preferably independent of any locations of the application. The application may thus be location independent, since the method works without any specific location associated with the application. A location independent application does not need to have any physical or virtual locations defined that would affect the performance of the application or the availability of the application for the user. Only context information of the user is needed for determining whether the temporal parameters characterizing the situation of the user fulfil the trigger context. In other words, the situation of the user is defined based on the context data of the user only. The context data is not compared with a location defined in or by the application. The location of the user has only importance as a part or a parameter of the context data of the user used for defining the situation of the user, since the location of the user may indicate that the user is likely to be able to be able to use the service provided by the application.

It is noted that the described application use cases are examples only. For a person skilled in the art, it is clear that the claimed features may be applied to a variety of applications with user-specific timing periods.

In an example, the user notification message may include an offer that identifies an incentive and a user operation that activates the incentive if the user operation is performed before the expiry of the user-specific timing interval. In view of the above examples, the application could detect from the context data that the user is potentially free already before the normal delivery of the promotional message, and the promotional message could read as "Want to see our spring collection? Come and see, and download 10$ voucher at the same time". This way the user would be guided to the promotion earlier, at a time that is suitable for his or her schedule, and the user would gain the satisfaction of being able to collect the incentive at the right time. At the same time, the distributor would have much better attendance for the promotion.

Correspondingly, in the game application example, the game application could detect from the context data that the user is potentially free shortly before the game event is complete. The reminder message could read as "The carrots will be grown in fifteen minutes. Come and play already now, and get additional beetroots to play with". This way the user would be guided to play at a time that is suitable for his or her schedule, and gain the satisfaction of being able to collect the incentive right when the interval set by the game event expires.

In a further example, the value of the incentive may be configured to be controlled by the user-specific timing interval. More specifically, the value of the incentive may be configured to be controlled by the length of the user-specific timing interval. In view of the game application, the incentive may include controllably reducing the user-specific timing interval. Accordingly, the application may be configured to detect from the context data that the user could be available for the service before the expiry of the user-specific timing interval, and as an incentive, shorten the period of the user-specific time limit so that the reward by the incentive becomes available earlier than initially set. For example, let us assume the game event initiates a user-specific game interval of eight hours for carrots to grow. However, the context-aware application may now be configured to detect that the context of the user is potentially appropriate for playing, and send an offer to allow the carrots to be fully grown in a shortened period, if the user returns to the game right away. In this case, the application may detect from the user context that the user could be available to play when only six hours of the user-specific time interval has passed. The application may be configured to deliver to the user a message "The carrots will be grown in two hours. Come and play, and the carrots will be fully grown right away!".

Accordingly, the context-aware computation of the application combined with the continuously increasing sensor data available through user devices may be used to provide the user the means to optimally enhance his or her gameplay by expedited earning of rewards without additionally disturbing necessary daily routines. From the point of view of the game service provider, the probability that the users return to play the game more frequently is increased. The service provided by the game application becomes more efficiently used, for the benefit of the user and the service provider.

Alternatively, or in addition, the value of the incentive may be dynamically varied in relation to the time interval from receipt of the user notification message to the user operation activating the incentive. In many applications, the worth of the incentive could be made to decrease the longer the time interval becomes. In view of the promotional application, the sum in the voucher may be configured to decrease in relation to the time interval from receipt of the user notification message to the user activating the application in the user device. In view of the game application, the number of fully grown carrots could be reduced in the course of time from receipt of the user notification.

Sometimes the context data may reveal situation of the user in periods ahead. For example, access to calendar data of a user may indicate times when the user most likely is not available for application based user notifications. In an example, the application may include a secondary ruleset configured to use the context data of the user to check whether expiry of the user-specific timing interval coincides with a period when a trigger context is impossible. If this is the case, the application may be configured to, at a specific time between the time of initiating the user-specific timing interval, and expiry of the user-specific timing interval, allow the secondary ruleset to overrule judgement based on the first ruleset of the trigger context, and provide the user notification notwithstanding the other temporal context of the user.

In view of the earlier example, let us assume the user-specific timing interval is the eight hours for the carrots to grow. At some point during the eight hours, the application may be configured to check the context data, and detect, that the expiry of the eight-hour interval coincides with a meeting in the calendar data of the user. As it is unlikely that the user can respond to a user notification at that time, the application may in this example send the user notification, and invite, possibly with an incentive, the user to play, even if the normal trigger context is not detected. The user may consider it possible to readjust his or her situation at that time, and gain the advantage by activating the incentive through a short game session.

Figure 4:
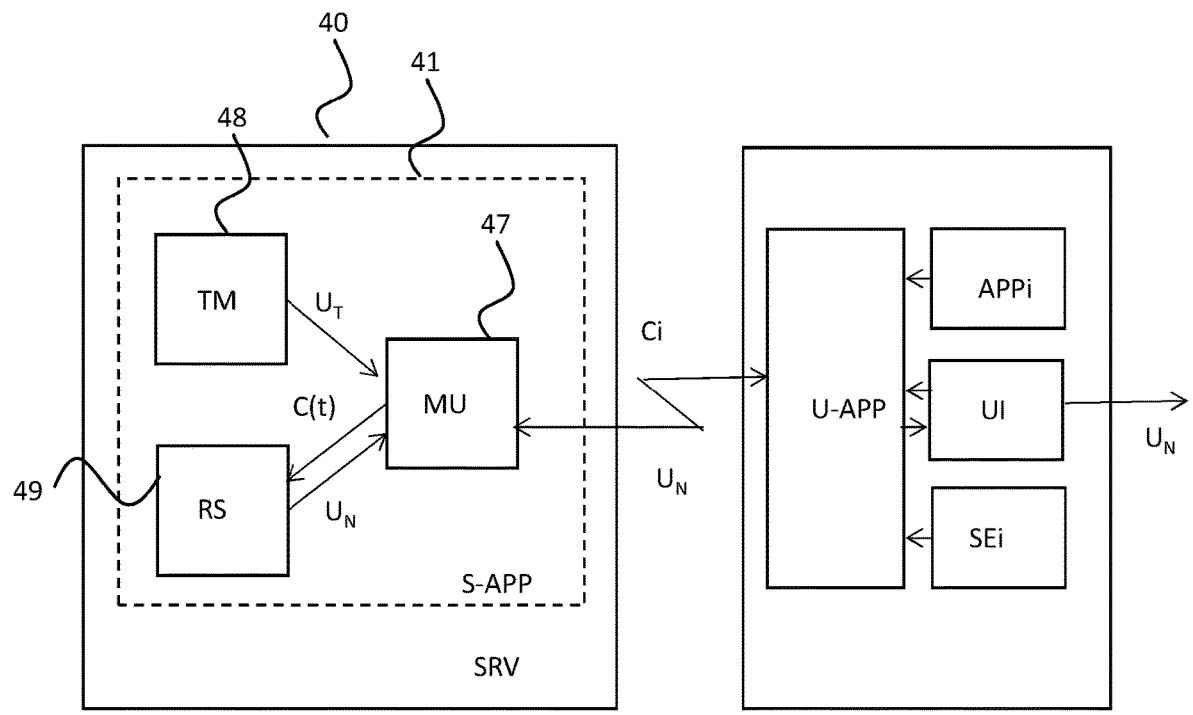
FIG. 4 illustrates functional elements in a client-server configuration.

The block chart of FIG. 4 illustrates on example of how the functional elements introduced in FIG. 3 may be arranged to implement the claimed features in a client-server configuration of FIG. 1. The server 40 may include a server application 41 that is communicatively connected to a user application 42 in the user device 43. The user application 42 may be configured to receive context data c1, c2, c3 from context sources 44, 45, 46 in the user terminal, or coupled to the user terminal, and deliver the context data Ci over a communication network to the server application 42. The context data Ci from the user application to the server application may include the context data blocks or signals c1, c2, c3 as they are received from the context sources, or the user application may be configured to compute from context data blocks or signals processed user context data for the server application. The server application 41 may include the monitoring unit 47, the timing module 48, and the ruleset unit 49, the operation of which is disclosed in FIG. 3. The user notification UN may be delivered from the server application to the user application, or the user notification may be stored in the user application, and the server application may trigger its output to the user when the trigger context is detected in the server.

Figure 5:
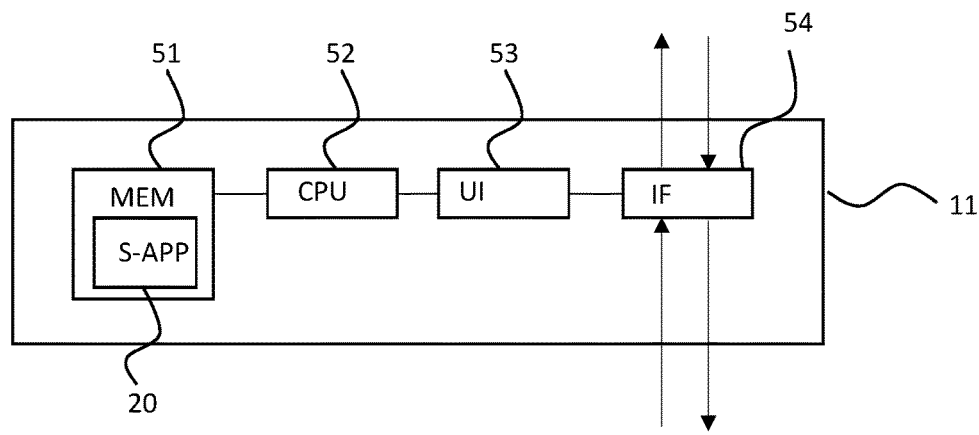
FIG. 5 illustrates a simplified example block diagram of the server.

FIG. 5 illustrates a simplified example block diagram of the server 11. The server 11 may comprise a memory 51 (MEM) for storing a server application 50 (S-APP). The memory 51 may comprise volatile or non-volatile memory, for example EEPROM, ROM, PROM, RAM, DRAM, SRAM, firmware, programmable logic, etc. The server 11 may further comprise one or more processor units 52 (CPU) for processing instructions and running computer programs, like the server application 50, and an interface unit 54 (IF) for sending and receiving messages.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method comprising:
    initiating a user-specific timing interval for triggering a function of a user application, wherein the user-specific timing interval controls a value of an incentive;
    storing a ruleset associating one or more triggering contexts with a user notification;
    monitoring context of the user while the user application is not being used by the user, the context characterising the situation of the user; and
    in response to detecting a triggering context before expiry of the user-specific timing interval based on the monitored context of the user while the user application is not being used by the user, shortening the user-specific timing interval to make the incentive available to the user earlier than initially set and providing the user with the user notification, wherein the triggering context corresponds to context data of the user indicating the user as being detected as available to use the user application and the situation as being potentially appropriate for using the user application while the user application is not being used by the user.

2. The method of claim 1, wherein the user-specific timing interval is triggered in response to a user input in use of the user application.

3. The method of claim 1, wherein the user-specific timing interval is generated according to a user input in use of the user application.

4. The method of claim 1, wherein the user-specific timing interval is generated in response to a user input of the user application.

5. The method of claim 1, wherein the user notification message includes an offer that identifies an incentive and a user operation that activates the incentive if the user operation is performed before the expiry of the user-specific timing interval.

6. The method of claim 5, wherein the value of the incentive is controlled by the length of the user-specific timing interval.

7. The method of claim 6, wherein the incentive is provided by reducing the length of the user-specific timing interval.

8. The method of claim 5, wherein the value of the incentive is dynamically varied in relation to the time interval from receipt of the user notification message by the user to the user operation activating the incentive.

9. The method of claim 1, wherein the method includes:
    storing a secondary ruleset associating a secondary triggering context with the user notification, rules of the secondary context data being met when expiry of the user-specific timing interval coincides with a period when detection of the trigger context is impossible;
    at a predefined time between the time of initiating the user-specific timing interval and expiry of the user-specific timing interval, providing the user notification notwithstanding whether the trigger context is met or not.

10. The method of claim 1, wherein the method is implemented in a user device or in a server.

11. A non-transitory computer readable medium having stored thereon computer-executable instructions, when executed by one or more processors, cause an apparatus to perform at least the steps for:
    initiating a user-specific timing interval for triggering a function of a user application, wherein the user-specific timing interval controls a value of an incentive;
    storing a ruleset associating one or more triggering contexts with a user notification;
    monitoring context of the user while the user application is not being used by the user, the context characterising the situation of the user;
    in response to detecting a triggering context before expiry of the user-specific timing interval based on the monitored context of the user while the user application is not being used by the user, shortening the user-specific timing interval to make the incentive available to the user earlier than initially set and providing the user with the user notification, wherein the triggering context corresponds to context data of the user indicating the user as being detected as available to use the user application and the situation as being potentially appropriate for using the user application while the user application is not being used by the user.

12. A user device, comprising:
    a timing module configured to initiate a user-specific timing interval for triggering a function of a user application, wherein the user-specific timing interval controls a value of an incentive;
    a ruleset module configured to store a ruleset associating one or more triggering contexts with a user notification;
    a monitoring unit, configured to monitor context of the user while the user application is not being used by the user, the context characterising the situation of the user, and in response to detecting a triggering context before expiry of the user-specific timing interval based on the monitored context of the user while the user application is not being used by the user, to shorten the user-specific timing interval to make the incentive available to the user earlier than initially set and to provide the user with the user notification, wherein the triggering context corresponds to context data of the user indicating the user as being detected as available to use the user application and the situation as being potentially appropriate for using the user application while the user application is not being used by the user.

13. A server, comprising:

a timing module configured to initiate a user-specific timing interval for triggering a function of a user application, wherein the user-specific timing interval controls a value of an incentive;

a ruleset module configured to store a ruleset associating one or more triggering contexts with a user notification;

a monitoring unit, configured to monitor context of the user while the user application is not being used by the user, the context characterising the situation of the user, and in response to detecting a triggering context before expiry of the user-specific timing interval based on the monitored context of the user while the user application is not being used by the user, to shorten the user-specific timing interval to make the incentive available to the user earlier than initially set and to provide the user with the user notification, wherein the triggering context corresponds to context data of the user indicating the user as being detected as available to use the user application and the situation as being potentially appropriate for using the user application while the user application is not being used by the user.

* * * * *